(12) United States Patent
Shimizu et al.

(10) Patent No.: US 7,873,383 B2
(45) Date of Patent: Jan. 18, 2011

(54) WIRELESS COMMUNICATION DEVICE, CONTROLLING METHOD AND PROGRAM THEREFOR

(75) Inventors: Atsushi Shimizu, Kawasaki (JP); Shoji Fukuzawa, Kawasaki (JP); Masato Hayashi, Sagamihara (JP); Susumu Matsui, Machida (JP)

(73) Assignee: Hitachi, Ltd., Tokyo (JP)

( * ) Notice: Subject to any disclaimer, the term of this patent is extended or adjusted under 35 U.S.C. 154(b) by 226 days.

(21) Appl. No.: 11/515,823

(22) Filed: Sep. 6, 2006

(65) Prior Publication Data

US 2007/0037602 A1 Feb. 15, 2007

(51) Int. Cl.
*H04M 1/00* (2006.01)

(52) U.S. Cl. .............. 455/552.1; 435/525; 435/440; 435/441; 370/332

(58) Field of Classification Search ............... 455/423, 455/550.1, 432.1–455, 464, 509, 516; 370/231, 370/235, 237, 331–333, 341
See application file for complete search history.

(56) References Cited

U.S. PATENT DOCUMENTS

| | | | | |
|---|---|---|---|---|
| 6,064,890 | A * | 5/2000 | Hirose et al. ............... 455/513 |
| 6,208,861 | B1 * | 3/2001 | Suzuki ...................... 455/441 |
| 6,466,938 | B1 * | 10/2002 | Goldberg ........................... 1/1 |
| 6,529,733 | B1 * | 3/2003 | Qing-An .................... 455/437 |
| 6,628,956 | B2 * | 9/2003 | Bark et al. ................... 455/522 |
| 6,847,997 | B1 * | 1/2005 | Kleiner ....................... 709/224 |
| 7,388,919 | B2 * | 6/2008 | Varma et al. ................ 375/259 |
| 7,684,760 | B2 * | 3/2010 | Kwak .......................... 455/69 |
| 2002/0131449 | A1 * | 9/2002 | Sugisaki ..................... 370/465 |
| 2002/0132611 | A1 * | 9/2002 | Immonen et al. ............ 455/414 |
| 2004/0102192 | A1 * | 5/2004 | Serceki ....................... 455/434 |
| 2004/0185786 | A1 * | 9/2004 | Mirbaha et al. .......... 455/67.11 |
| 2005/0071476 | A1 * | 3/2005 | Tejaswini et al. ........... 709/227 |
| 2005/0245264 | A1 * | 11/2005 | Laroia et al. ................ 455/445 |
| 2005/0254463 | A1 * | 11/2005 | Suzuki et al. ............... 370/335 |
| 2006/0107165 | A1 * | 5/2006 | Murata et al. ............... 714/748 |
| 2006/0218302 | A1 * | 9/2006 | Chia et al. ................... 709/245 |

FOREIGN PATENT DOCUMENTS

| | | |
|---|---|---|
| JP | 2002-354010 | 12/2002 |
| JP | 2005-012684 | 1/2005 |

* cited by examiner

*Primary Examiner*—Kamran Afshar
*Assistant Examiner*—Babar Sarwar
(74) *Attorney, Agent, or Firm*—Antonelli, Terry, Stout & Kraus, LLP (57) ABSTRACT

To make is possible to perform communication adapted to changes in a communication environment, a wireless communication device comprises a wireless communication unit for performing communication with another communication device through a wireless communication network, a communication quality evaluation unit for generating an evaluation value with regards to a communication quality of the communication, a communication mode switch unit for switching communication modes for use in the communication according to the evaluation value.

13 Claims, 11 Drawing Sheets

COMMUNICATION PARAMETERS 157

| Retransmission Interval | 50ms | |
|---|---|---|
| Redundant Transmission Flag | False | 1571 |
| Packet Length | 500bytes | 1572 |
| Transmission Power | 15dB | 1573 |
| | | 1574 |

FIG. 3

COMMUNICATION PARAMETER SPECIFIED VALUES 158

| Communication Quality | Retransmission Interval (1582) | Redundant Transmission Flag (1583) | Packet Length (1584) | Transmission Power (1585) |
|---|---|---|---|---|
| Good | 50ms | False | 500bytes | 15dB |
| Not Good | 10ms | True | 100bytes | 30dB |

| MEASUREMENT HISTORY INFORMATION 1511 | 1512 | 1513 | 1514 | 1515 | 1516 | 1517 | 1518 | 151 ↙ 1519 |
|---|---|---|---|---|---|---|---|---|
| Date and Time | Radio-Signal Strength | Retrans- mission Count | Movement Speed | The Number of Other Devices in the Vicinity | Ambient Temperature | Position Information | Channel | Communication Quality |
| 03/15/2005, 17:50 | 6dB | 3 | 33km/h | 15 | 12 | ○°△' □"/ ○°□' □" | 1 | Not Good |
| 03/15/2005, 17:45 | 15dB | 1 | 40km/h | 2 | 15 | ○°△' □"/ ○°□' □" | 1 | Good |
| ... | ... | ... | ... | ... | ... | ... | ... | ... |

Environmental Information (columns 1514–1518)

WIRELESS COMMUNICATION DEVICE, CONTROLLING METHOD AND PROGRAM THEREFOR

FIELD OF THE DISCLOSURE

The present disclosure relates to a wireless communication device, a controlling method and a program therefor.

BACKGROUND

As a system for efficiently performing data communication in wireless communication, for example, Japanese Patent Application Laid-open Publication NO. 2002-354010 discloses a device in which, upon starting hand-over for a wireless data communication device switching base stations, a retransmission timer is paused so that unnecessary packet retransmission can be avoided.

However, in wireless communication, not only hand-over for switching base stations, there are many other factors bringing about changes in a communication environment. For example, while a wireless communication device is moving, the number of other communication devices in its vicinity may be increasing, causing congestion in wireless communication, or radio shielding may exist in the area where the device is getting in, weakening the strength of radio-signal to be received. A wireless communication device is required to keep efficient communication even in such a changeable communication environment.

SUMMARY

The present disclosure has been made in consideration of the above-mentioned circumstance, and an object thereof is to provide a wireless communication device, a controlling method and a program therefor that make it possible to perform wireless communication adapted to changes in a communication environment.

To achieve the foregoing object, an aspect of the present disclosure is a wireless communication device comprising a wireless communication unit for performing communication with another communication device through a wireless communication network, a communication quality evaluation unit for generating an evaluation value with regards to a communication quality of the communication, a communication mode switch unit for switching communication modes for use in the communication according to the evaluation value.

DETAILED DESCRIPTION OF A PREFERRED EMBODIMENT

Figure 1:
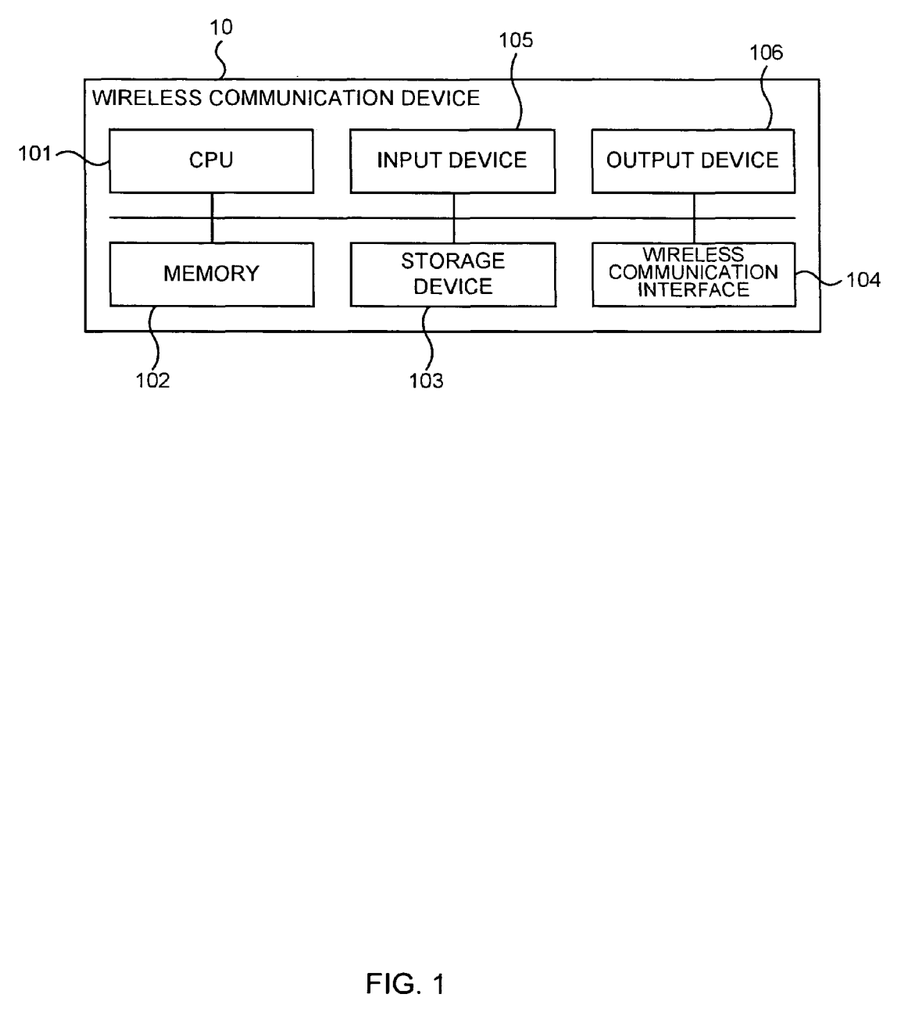
FIG. 1 is a hardware block diagram of a wireless communication device 10.

In the following, a wireless communication device 10 with regard to one exemplary embodiment of the present disclosure will be described with reference to the accompanying drawings. The wireless communication device 10 in this embodiment performs packet communication with a base station through a wireless communication system, and may be embodied as, for example, an in-car navigation device. FIG. 1 is a hardware block diagram of the wireless communication device 10. As shown in FIG. 1, the wireless communication device 10 comprises a CPU 101, a memory 102, a storage device 103, a wireless communication interface 104, an input device 105, and an output device 106.

The storage device 103 stores a program, data and the like, and may be embodied as, for example, a hard disk, a CD-ROM, a DVD-ROM, a flash memory, or a NVRAM (Non Volatile RAM). The CPU 10 realizes various functions as wireless communication device by reading out the program stored on the storage device 103 to the memory 102, and executing it. The input device 105 is responsible for accepting a data input, and may be embodied as, for example, a button, a switch, a keyboard, a mouse, a touch panel, or a microphone. The output device 106 is responsible for outputting data, and may be embodied as, for example, a display, a printer, or a speaker.

Figure 2:
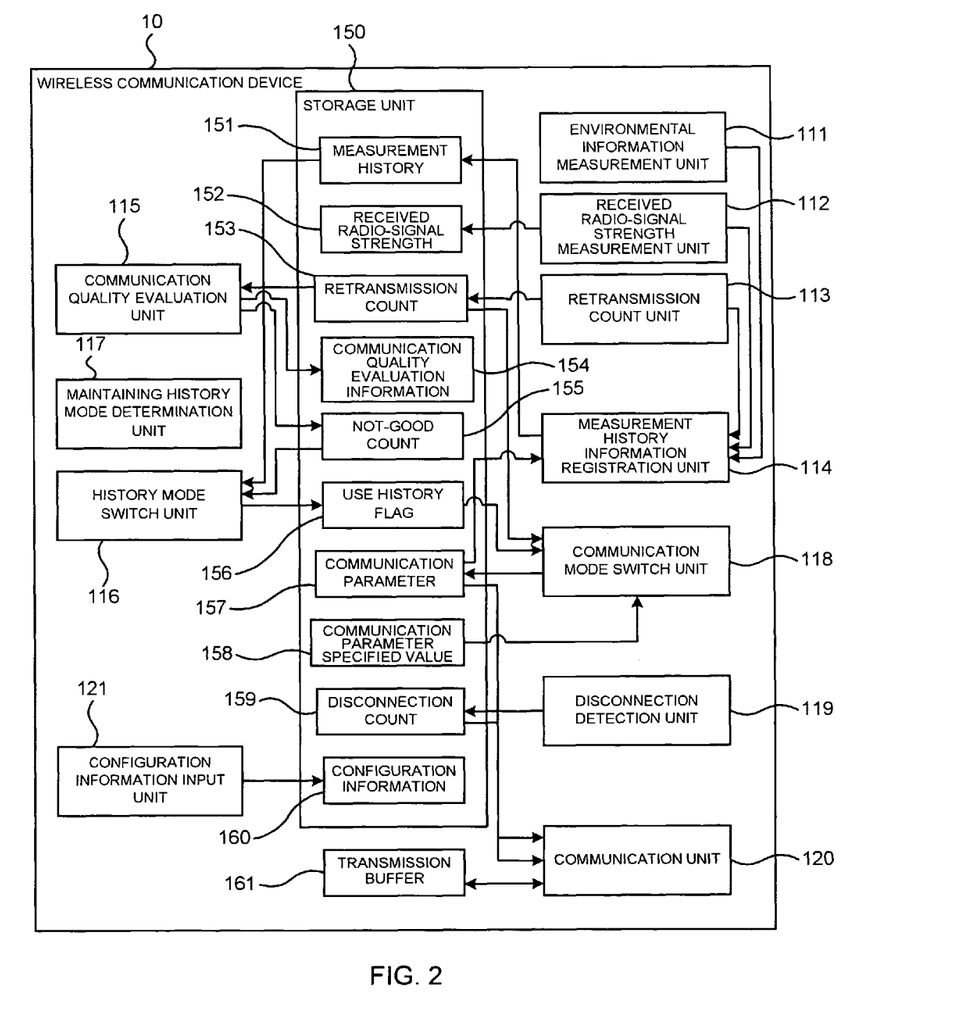
FIG. 2 is a software block diagram of the wireless communication device 10.

FIG. 2 is a software block diagram of the wireless communication device 10. As shown in FIG. 2, the wireless communication device 10 comprises an environmental information measurement unit 111, a received radio-signal strength measurement unit 112, a retransmission count unit 113, a measurement history information registration unit 114, a communication quality evaluation unit 115, a history mode switch unit 116, a maintaining history mode determination unit 117, a communication mode switch unit 118, a disconnection detection unit 119, a communication unit 120, a configuration information input unit 121, a storage unit 150, and a transmission buffer 161. The storage unit 150 stores a measurement history 151, a received radio-signal strength 152, a retransmission count 153, communication quality evaluation information 154, a not-good count 155, a use history flag 156, communication parameters 157, communication parameter specified values 158, a disconnection count 159, and configuration information 160. It should be appreciated that the functional units in the wireless communication device 10, such as the environmental information measurement unit 111, the received radio-signal strength measurement unit 112, the retransmission count unit 113, the measurement history information registration unit 114, the communication quality evaluation unit 115, the history mode switch unit 116, the maintaining history mode determination unit 117, the communication mode switch unit 118, the disconnection detection unit 119, the communication unit 120, and the configuration information input unit 121, are respectively realized by the CPU 101 executing the program stored on the memory 102. Meanwhile, the storage unit 150 and the transmission buffer 161 are respectively embodied as a storage area prepared in the memory 102 or the storage device 103 equipped with the wireless communication device 10.

The environmental information measurement unit 111 measures information regarding an environment in which the wireless communication device 10 performs communication (such information is hereinafter referred to as environmental information) at a predetermined time interval. The environmental information includes a movement speed of the wireless communication device 10, the number of other communication devices (base stations, mobile terminals, etc.) with which the wireless communication device 10 can communicate at that time (the number of other devices in the vicinity), an ambient temperature, position information including degrees of longitude and latitude, and a channel used in the wireless communication. The movement speed is, for example, a speed of a vehicle on which the wireless communication device 10 is installed. The movement speed, the ambient temperature, and the position information may be measured with, for example, a GPS system, a gyro, or a temperature sensor provided in the vehicle.

The received radio-signal strength measurement unit 112 measures strength of radio-signal received from another communication device (hereinafter referred to as received radio-signal strength) at a predetermined time interval. The received radio-signal strength may be measured with, for example, RSSI (Radio Signal Strength Indicator). The value measured by the received radio-signal strength measurement unit 112 is stored in the storage unit 150 as the received radio-signal strength 152.

Figure 3:
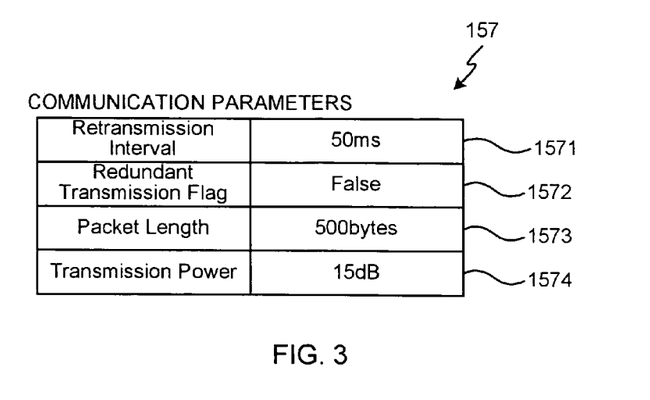
FIG. 3 shows an example of a setting of communication parameters 157.

The communication unit 120 is responsible for wireless communication with another communication device, and the communication parameters 157 are set values for setting a communication mode used by the communication unit 120. FIG. 3 shows an example of the communication parameters 157. As shown in FIG. 3, the communication parameters 157 include a retransmission interval 1571, a redundant transmission flag 1572, a packet length 1573, and a transmission power 1574.

The retransmission interval 1571 is an interval at which a determination is made as to whether or not a packet transmitted to the base station (hereinafter referred to as transmission packet) has failed to reach the base station (packet loss is occurred), and the transmission packet is retransmitted in the case of packet loss occurrence. The packet loss may be detected by a known detection method provided in TCP/IP or other communication protocols.

The redundant transmission flag 1572 is information indicating whether or not to transmit a packet required for recovery of a transmission packet on the base station side (such a packet is hereinafter referred to as redundant packet), along with the transmission packet. The redundant packet is, for example, data required for error correction, and a packet is regarded to reach the base station if either one of the transmission packet or the redundant packet reaches there. Here, it should be appreciated that the redundant packet may be identical to the transmission packet. This means that the wireless communication device 10 transmits to the base station a plurality of transmission packets having the same contents simultaneously, and the transmission packet is regarded to reach the base station when at least one of the transmission packets reaches there. The packet length 1573 is a data length of a transmission packet. The transmission power 1574 is power of radio-signal when transmitting a transmission packet.

The retransmission count unit 113 counts times of a packet being retransmitted by the communication unit 120 at a predetermined time interval. The number of packet retransmissions counted by the retransmission count unit 113 is stored in the storage device 150 as the retransmission count 153.

The communication quality evaluation unit 115 evaluates a communication quality of communication between the wireless communication device 10 and the base station. In the present embodiment, the communication quality evaluation unit 115 evaluates the commutation quality as one of two grades, "good" and "not good", according to whether or not the retransmission count 153 exceeds a predetermined threshold. The information indicating this "good" or "not good" evaluated by the communication quality evaluation unit 115 is stored in the storage unit 150 as the communication quality evaluation information 154 (corresponding to communication mode identification information in the present disclosure). The not-good count 155 is incremented if the communication quality evaluation unit 115 evaluates the communication quality as "not good", while the count 155 is decremented if the evaluation unit 115 evaluates the quality as "good".

The communication mode switch unit 118 switches the communication modes for use in communication performed by the communication unit 120 at a predetermined time interval, by setting the communication parameters 157 according to the communication quality. The specified values for the communication parameters 157 related to the communication quality evaluation information 154 are stored in the storage unit 150 as the communication parameter specified values 158. The communication mode switch unit 118 sets the communication mode by reading out the specified values 158 corresponding to the communication quality evaluation information 154 from the storage unit 150 and setting them in the communication parameters 157. A process executed by the communication mode switch unit 118 will be discussed herein below in greater detail.

Figure 4:
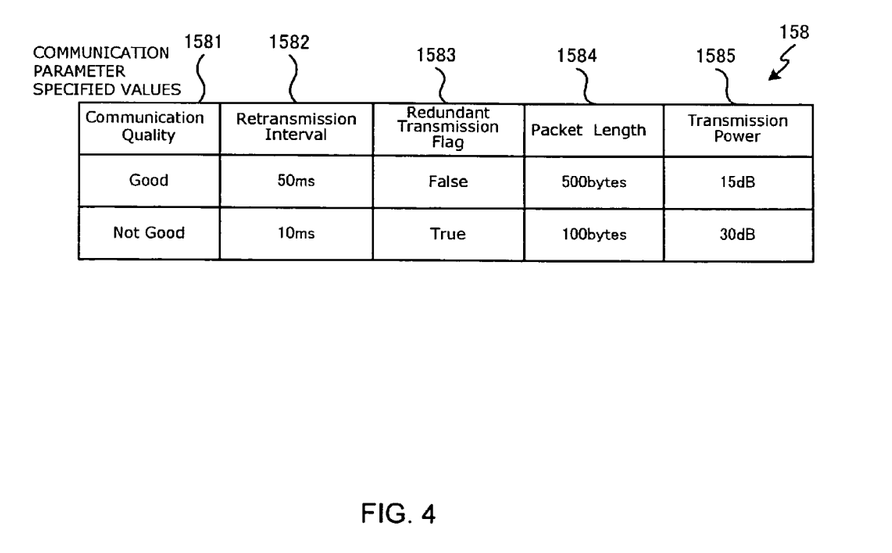
FIG. 4 shows an example of communication parameter specified values 158.

FIG. 4 shows an example of the communication parameter specified values 158. As shown in FIG. 4, the communication parameter specified values 158 include the specified values to be set in the above-mentioned communication parameters 157 for each communication quality 1581, that are a retransmission interval 1582, a redundant transmission flag 1583, a packet length 1584, and a transmission power 1585. Referring to FIG. 4, it should be appreciated that, as to the specified values 158 corresponding to the communication quality 1581 of "not good", when being compared to the values 158 corresponding to the quality 1581 of "good", the retransmission interval 1582 and the packet length 1584 are shorter, while the transmission power 1581 is higher. Moreover, in the redundant transmission flag 1583 in the specified values 158, for the communication quality 1581 of "good", "False" which indicates that redundant transmission is not performed is set, while for the communication quality 1581 of "not good", "True" which indicates that redundant transmission is performed is set.

Figure 5:
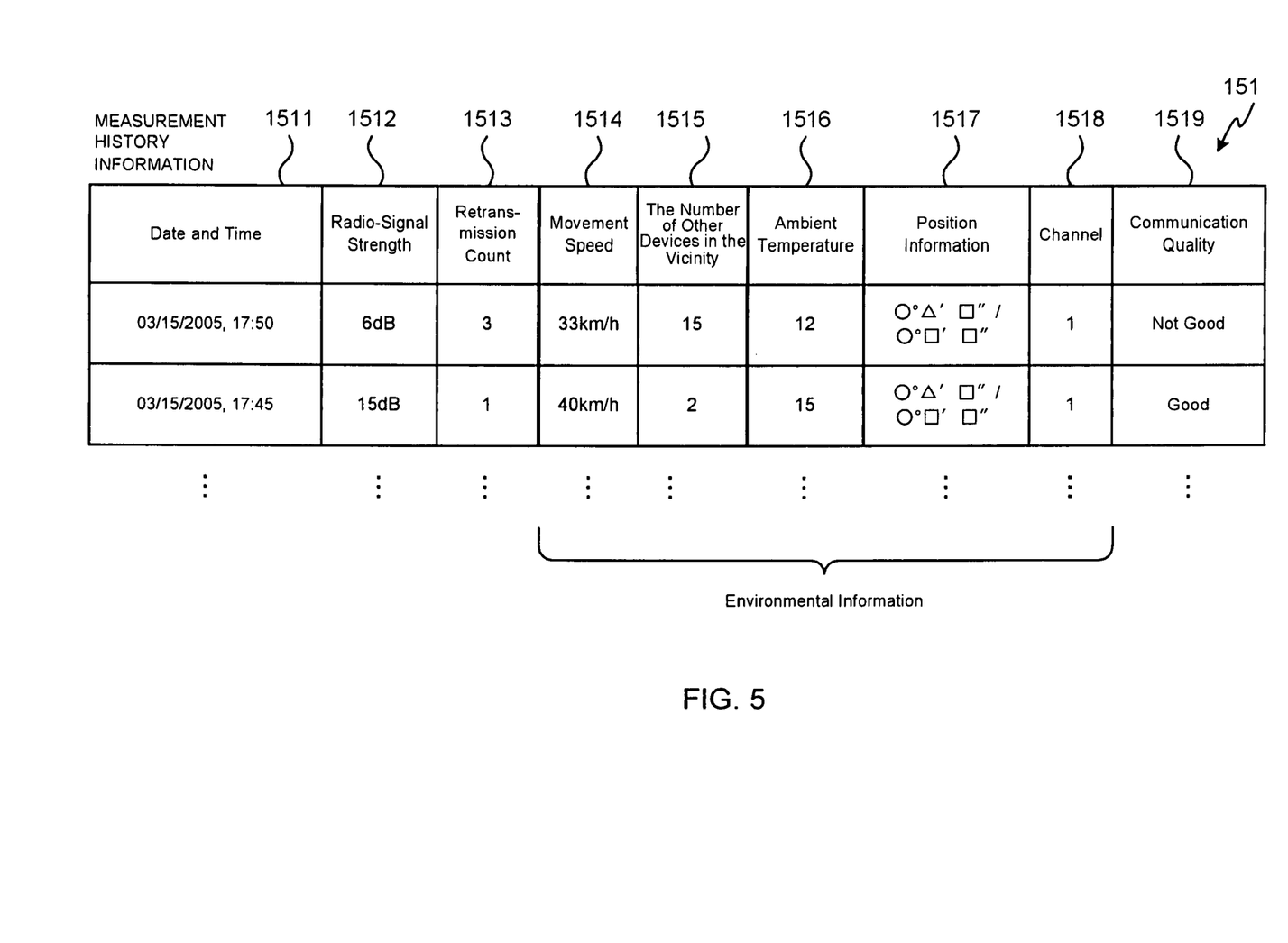
FIG. 5 shows a structure of measurement history information stored as a measurement history 151.

The measurement history information registration unit 114 registers records of the before-mentioned measured values (hereinafter referred to as measurement history information) in the measurement history 151. FIG. 5 shows a structure of the measurement history information stored as the measurement history 151. As shown in FIG. 5, the measurement history information includes a date and time 1511, a received radio-signal strength 1512 measured by the received radio-signal strength measurement unit 112, a retransmission count 1513 counted by the retransmission count unit 113, the environmental information (a movement speed 1514, the number of other devices in the vicinity 1515, an ambient temperature 1516, position information 1517, and a channel 1518) measured by the environmental information measurement unit 111, and information indicating the communication quality (a communication quality 1519) evaluated by the communication quality evaluation unit 115.

The history mode switch unit 116 determines to set the communication mode based on the measurement history or to set the mode according to the currently measured values including the retransmission count 153, at a predetermined time interval. A process executed by the history mode switch unit 116 will be discussed herein below in greater detail. The determination by the history mode switch unit 116 is set in the use history flag 156. If the history mode switch unit 116 determines to set the communication mode based on the history, "True" is set in the use history flag 156. Otherwise, "False" is set therein.

In the case that the history mode switch unit 116 determines to set the communication mode based on the history, the maintaining history mode determination unit 117 determines according to the communication quality whether or not to continue communication using the communication mode based on the history, at a predetermined time interval. A process executed by the maintaining history mode determination unit 117 will be discussed herein below in greater detail.

The disconnection detection unit 119 detects an occurrence of disconnection between the wireless communication device 10 and the base station. In the present embodiment, the disconnection detection unit 119 transmits test data to the base station, and determines an occurrence of disconnection therebetween according to whether or not to be able to receive a response to the test data from the base station. With being able to receive the response from the base station, the disconnection detection unit 119 decrements the disconnection count 159, provided that the count 159 is 1 or more. Without the response, the unit 119 increments the count 159.

The transmission buffer 161 is, as will be discussed hereinbelow, a storage area in which the communication unit 120 saves a packet to be transmitted (transmission packet) in the case of determining communication is currently impossible between the wireless communication device 10 and the base station. The transmission buffer 161 may be embodied as, for example, a queue in a storage area prepared in the memory 102 or the storage device 103.

Figure 6:
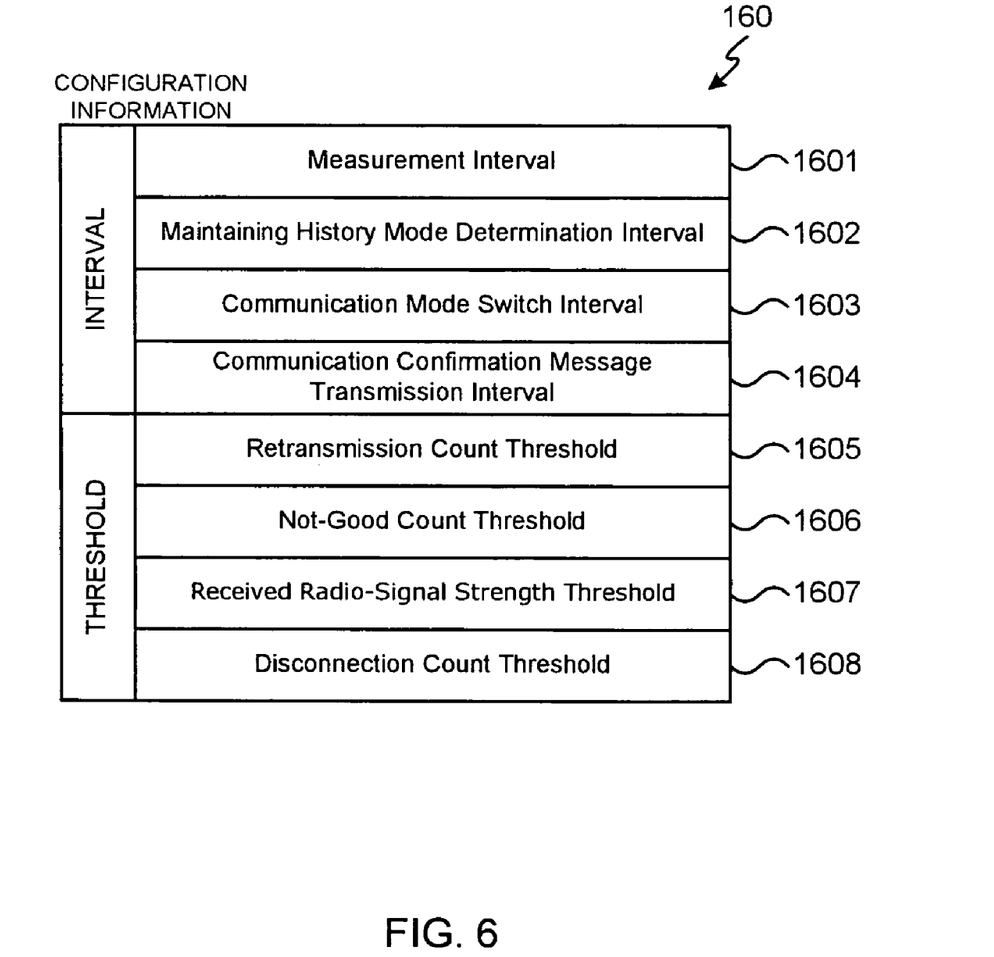
FIG. 6 shows a structure of configuration information 160.

The configuration information 160 is information including a measurement interval, thresholds for determinations, and others. FIG. 6 shows a structure of the configuration information 160. More specifically, as shown in FIG. 6, the configuration information 160 includes various intervals such as a measurement interval 1601, a maintaining history mode determination interval 1602, a communication mode switch interval 1603, and a connection confirmation message transmission interval 1604, and various thresholds such as a retransmission count threshold 1605, a not-good count threshold 1606, a received radio-signal strength threshold 1607, and a disconnection count threshold 1608.

The measurement interval 1601 is an interval at which the environmental information measurement unit 111, the received radio-signal strength measurement unit 112, and the retransmission count unit 113 carry out their respective measurements. The maintaining history mode determination interval 1602 is an interval at which the maintaining history mode determination unit 117 makes a determination whether or not to continue communication using the communication mode based on the measurement history. The communication mode switch interval 1603 is an interval at which the communication mode switch unit 118 makes the setting of the communication mode according to the communication quality. The connection confirmation message transmission interval 1604 is an interval at which the disconnection detection unit 119 transmits test data to the base station.

The retransmission count threshold 1605 is a threshold to which the communication quality evaluation unit 115 compares the retransmission count 153 for an evaluation of the communication quality. If the retransmission count 153 exceeds the threshold 1605, the communication quality is evaluated as "not good". The not-good count threshold 1606 is a threshold used by the maintaining history mode determination unit 117 in determining whether or not to continue communication using the communication mode based on the measurement history. The received radio-signal strength threshold 1607 is a threshold used by the communication mode switch unit 118 in switching the communication modes. The disconnection count threshold 1608 is a threshold used by the communication unit 120 in transmitting data to the base station. Processes using these thresholds will be discussed herein below in greater detail.

The intervals and thresholds included in the configuration information 160 can be changed by a user of the wireless communication device 10. The configuration information input unit 121 accepts the user's inputs for the items in the configuration information 160, and sets the accepted inputs respectively in the configuration information 160.

Figure 7:
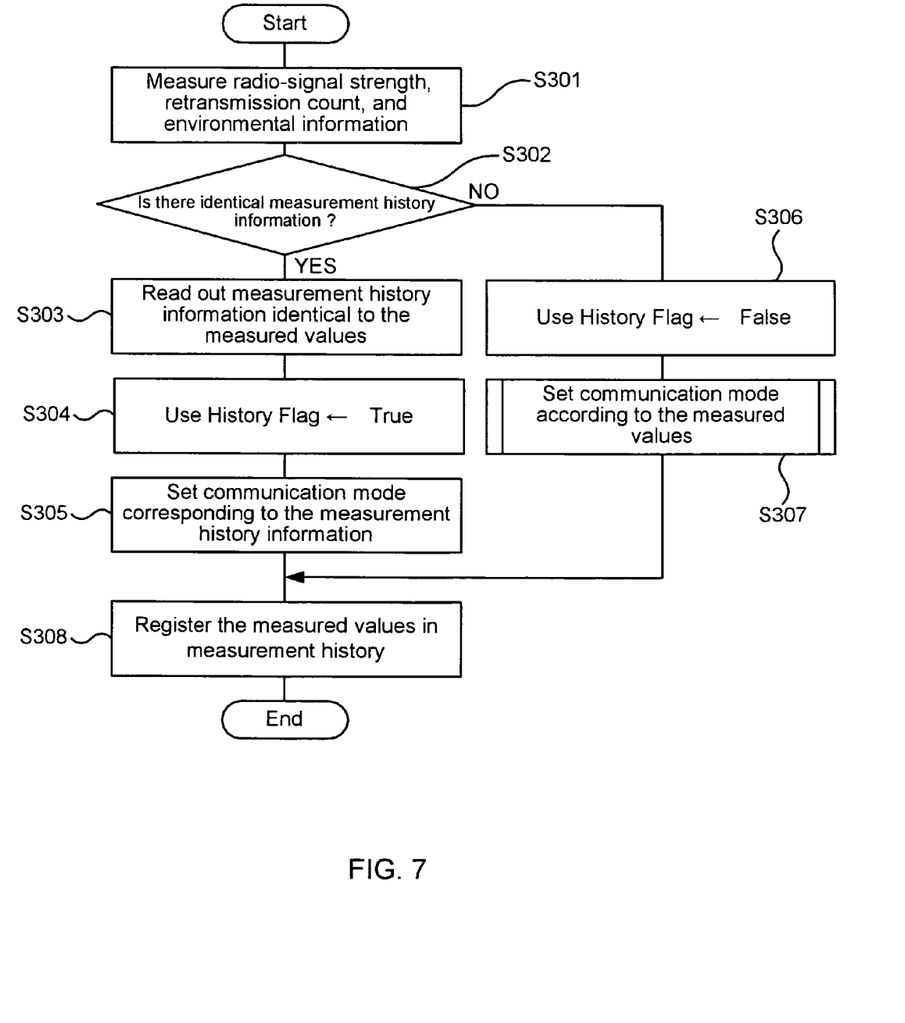
FIG. 7 is a flow chart showing a process of determining whether or not to set a communication mode based on the measurement history.

FIG. 7 is a flow chart showing a process of determining whether or not to set the communication mode based on the measurement history. The process shown in FIG. 7 is executed at intervals of the measurement interval 1601.

First, the environmental information measurement unit 111 measures the environmental information such as the movement speed and the number of other devices in the vicinity as mentioned before, and the received radio-signal strength measurement unit 112 measures the received radio-signal strength, and the retransmission count unit 113 counts times of packet retransmission (S301). Then, the history mode switch unit 116 determines whether or not there is registered in the measurement history 151, measurement history information having the same environmental information, received radio-signal strength, and retransmission count as measured this time (S302).

If there is registered such measurement history information (S302: YES), the history mode switch unit 116 reads out that measurement history information from the measurement history 151 (S303), and sets "True" in the use history flag 156 (S304), and then sets the communication parameter specified values 158 corresponding to the communication quality 1519 of the read out measurement history information in the communication parameters 157 (S305).

Meanwhile, if there is not registered such measurement history information (S303: NO), the history mode switch unit 116 sets "False" in the use history flag 156 (S306), and then the communication mode switch unit 118 starts a process of setting the communication mode based on the measured values, as will be discussed herein below (S307).

The measurement history information registration unit 114 creates new measurement history information including the measurement date/time, the measurement results of the environmental information, the received radio-signal strength and the retransmission count, and the communication quality evaluation information 154, then registers the created information in the measurement history 151 (S308).

In the present embodiment, according to this process, if there is a previous record with the same environmental information and others as measured at that time, the wireless communication device 10 performs communication with use of the same communication mode as the previous one. In this way, it is possible to switch to the communication mode based on the previous record, responding to changes in the communication environment, and to perform communication using it.

Figure 8:
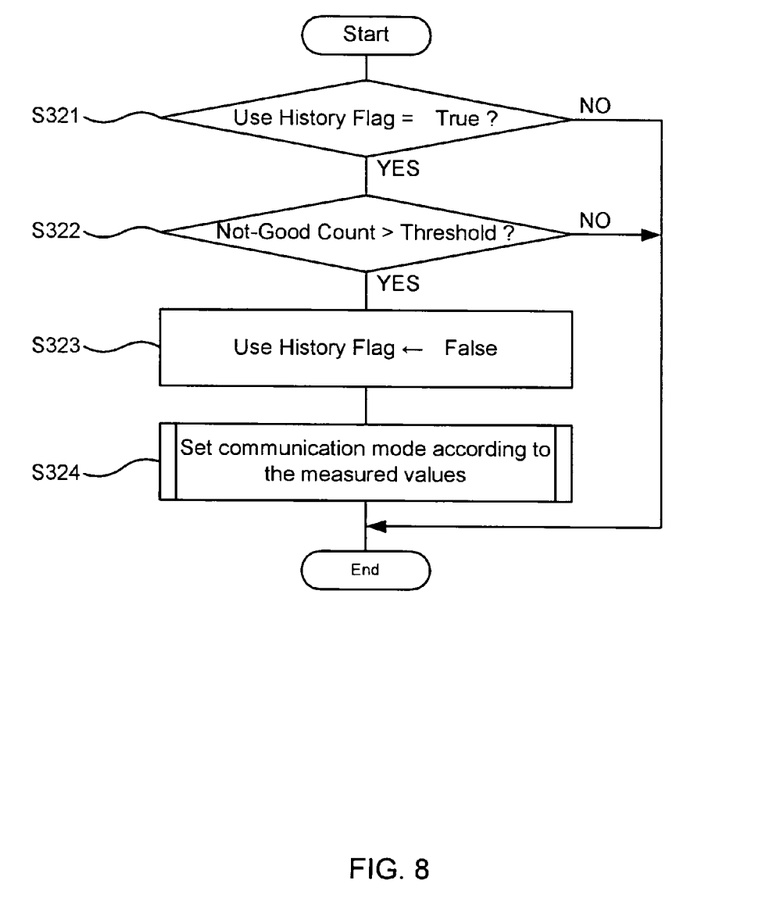
FIG. 8 is a flow chart showing a process of determining whether or not to continue communication using the communication mode based on the measurement history, according to a not-good count.

FIG. 8 is a flow chart showing a process of determining whether or not to continue communication using the communication mode based on the measurement history. The process shown in FIG. 8 is executed at intervals of the maintaining history mode determination interval 1602.

If the use history flag 156 is set as "True" (S321: YES), the maintaining history mode determination unit 117 determines whether or not the not-good count 155 exceeds the not-good count threshold 1606 of the configuration information 160 (S322). If the count 155 exceeds the threshold 1606 (S322: YES), then the maintaining history mode determination unit 117 sets "False" in the use history flag 156 (S323), and the communication mode switch unit 118 starts the process of setting the communication mode based on the measured values, as will be discussed herein below (S324).

According to this process, while the communication mode based on the measurement history is used in communication, when the not-good count 155 exceeds the not-good threshold 1606, the communication mode is reset according to the values measured in real time. That is, if communication using the communication mode based on the previous record does not have a good quality, the communication mode is switched to the mode fitting to the currently measured values, so that it is possible to perform the appropriate communication adapted to changes in the communication environment.

Figure 9:
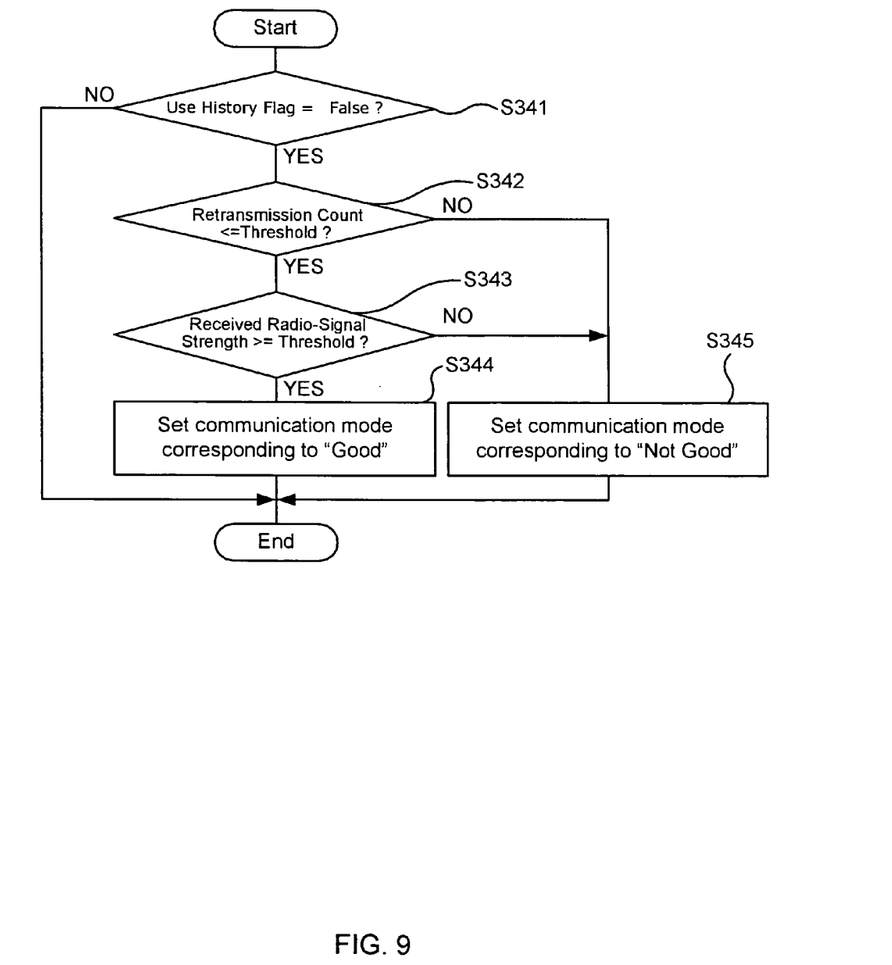
FIG. 9 is a flow chart showing a process of setting the communication mode based on the measured values.

FIG. 9 is a flow chart showing the process of setting the communication mode based on the measured values. The process shown in FIG. 9 is executed at intervals of the communication mode switch interval 1603 of the configuration information 160, in addition to the timings of S307 in FIG. 7 and S324 in FIG. 8.

If the use history flag 156 is set as "False" (S341: YES), the communication mode switch unit 118 determines whether or not the retransmission count 153 is less than or equal to the retransmission count threshold 1605 of the configuration information 160 (S342). If the count 153 is less than or equal to the threshold 1605 (S342: YES), the communication mode switch unit 118 then determines whether or not the received radio-signal strength 152 is greater than or equal to the received radio-signal strength threshold 1607 of the configuration information 160 (S343). If the strength 152 is greater than or equal to the threshold 1607 (S343: YES), the communication mode switch unit 118 sets the communication parameter specified values 158 corresponding to the communication quality 1581 of "good" in the communication parameters 157 (S344).

Meanwhile, if the retransmission count 153 is greater than the retransmission count threshold 1605 (S342: NO), or if the received radio-signal strength 152 is less than the received radio-signal strength threshold 1607 (S343: NO), the communication mode switch unit 118 sets the communication parameter specified values 158 corresponding to the communication quality 1581 of "not good" in the communication parameters 157 (S345).

According to this process, when the retransmission count 153 is small, and the received radio-signal strength 152 is strong, the communication quality is taken as "good", and then the communication mode is switched to the one with long retransmission interval, no redundant transmission, long packet length, and low transmission power. Conversely, when the retransmission count 153 is large, or the received radio-signal strength 152 is weak, the communication quality is taken as "not good", and then the communication mode is switched to the other with short retransmission interval, performing redundant transmission, short packet length, and high transmission power.

When the communication quality is good, packet transmission delay may occur, but packet loss is unlikely to occur. Therefore, by setting the long retransmission interval in this case, the time period until determining a packet loss occurrence is made extended. Due to this setting, just a slight delay of transmission does not lead to packet retransmission, so that it becomes possible to avoid unnecessary retransmission, and thereby possible to perform efficient communication. Meanwhile, when the communication quality is not good, by setting the short retransmission interval, the timing of determination on a packet loss occurrence is hastened. Due to this setting, under a circumstance that packet loss is likely to occur, the waiting time until determining packet loss is made shortened, so that it becomes possible to keep communication efficient.

In addition, when the communication quality is good, it is highly likely that a packet can reach the base station. Therefore in this case, redundant transmission is set to be omitted. By this setting, it becomes possible to reduce processing load on the wireless communication device 10 and communication load on the wireless communication path. Meanwhile, when the communication quality is not good, redundant transmission is set to be performed. By this setting, even if a transmission packet is lost, this packet can be recovered only if its redundant packet reaches the base station, and thereby it becomes possible to make communication more reliable.

Also, when the communication quality is good, it is unlikely that part of packet is lost due to noise or other interferences. Therefore, the length of a packet to be transmitted is set to be long, so that it becomes possible to reduce overhead regarding a header and the like added to each packet, and thereby possible to perform efficient packet communication. Meanwhile, when the communication quality is not good, a packet to be transmitted is set to be short, so that it is possible to reduce the amount of data required to be retransmitted in the case that part of packet is lost. Therefore, even under a circumstance that packet loss is likely to occur, it is possible to keep packet communication efficient.

Also, when the communication quality is good, high power of radio-signal may not be required for performing communication, so that this power is set to be low. By this setting, it becomes possible to reduce power consumption of the wireless communication device 10. Meanwhile, when the communication quality is not good, by setting high power, it becomes possible to keep reliable communication.

Figure 10:
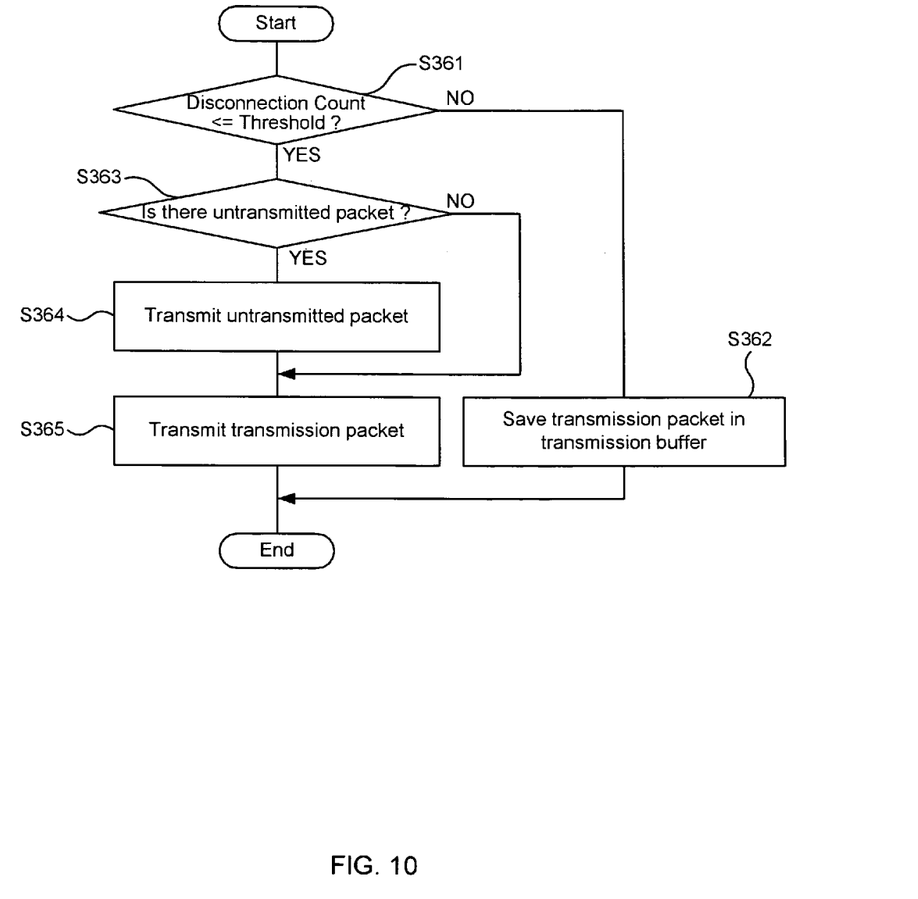
FIG. 10 is a flow chart showing a process of transmitting a transmission packet.

Now, a process of transmitting a transmission packet by the communication unit 120 is described with reference to FIG. 10.

The communication unit 120 determines whether or not the disconnection count 159 is less than or equal to the disconnection count threshold 1608 of the configuration information 160 (S361), and if the count 159 is greater than the threshold 1608 (S361: NO), then saves the transmission packet in the transmission buffer 161 (S362) and ends the process.

Meanwhile, if the count 159 is less than or equal to the threshold 1608 (S361: YES), then the communication unit 120 determines whether or not there is any packet saved in the transmission buffer 161 (such a packet is hereinafter referred to as untransmitted packet) (S363). If there is an untransmitted packet in the transmission buffer 161(S363: YES), the communication unit 120 first transmits that untransmitted packet (S364), and then transmits the transmission packet (S365).

If no untransmitted packet is in the transmission buffer 161 (S363: NO), the communication unit 120 transmits the transmission packet (S365) and ends the process.

According to this process, in the case of disconnection, the communication unit 120 saves a transmission packet in the transmission buffer 161, or in the case of being able to perform communication, transmits the transmission packet after transmitting an untransmitted packet saved in the transmission buffer 161. In this way, it is possible to avoid submitting a transmission packet at the time of disconnection, and thereby to make communication efficient.

Figure 11:
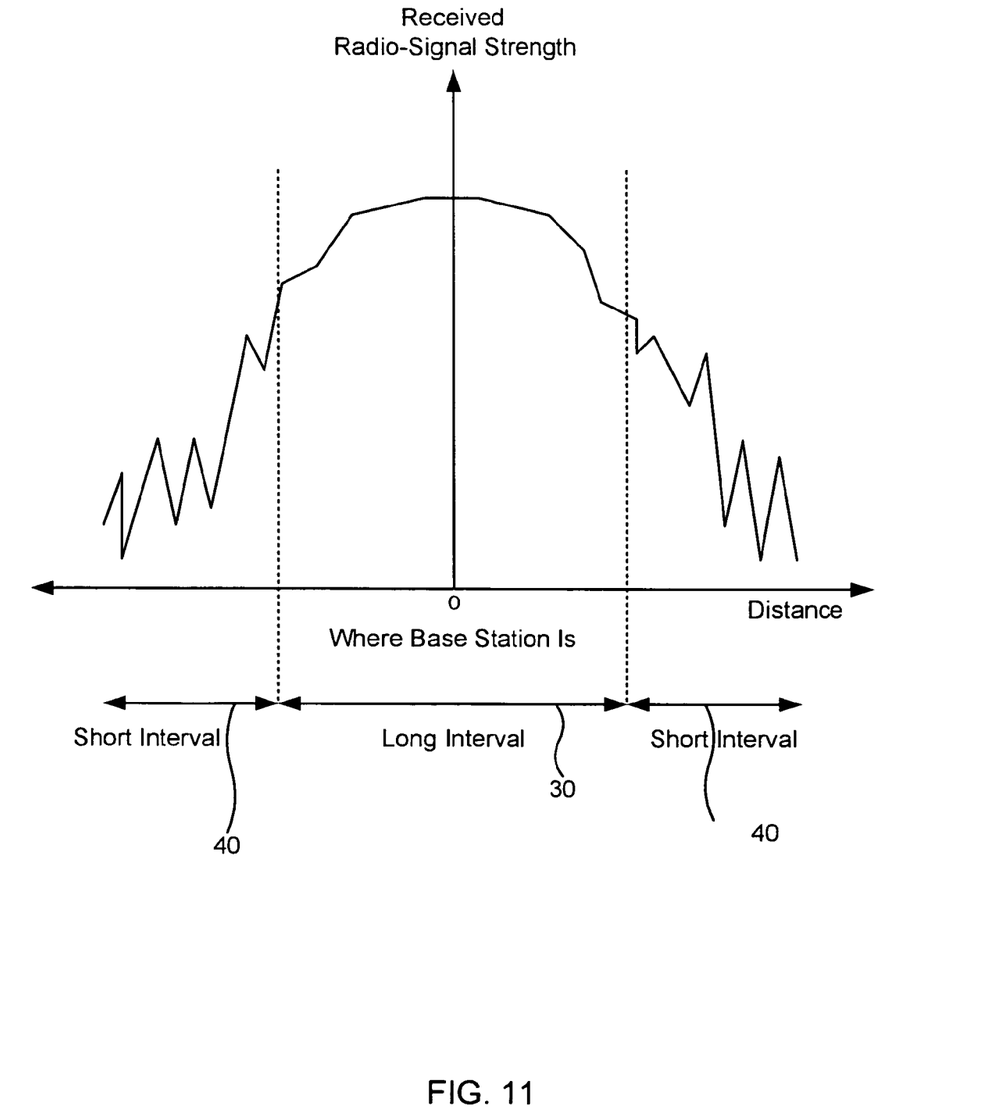
FIG. 11 shows an example of changes of received radio-signal strength, according to distance from a base station.

Meanwhile, the measurement interval (the measurement interval 1601 of the configuration information 160), at which the environmental information measurement unit 111 measures the environmental information, and the received radio-signal strength measurement unit 112 measures the received radio-signal strength, and the retransmission count unit 113 counts times of retransmission, may be able to be changed according to distance from the base station. FIG. 11 shows an example of changes of the received radio-signal strength, according to distance from the base station. As understood from FIG. 11, in the area 30 relatively near to the base station, the received radio-signal strength is not changed so much even when the wireless communication device 10 is moving away from the base station, while in the area 40 relatively far from the base station, the received radio-signal strength is drastically changed in response to changes of distance from the base station. Therefore, by selecting the short measurement interval for the area 40 and making the communication mode set based on the values measured in this way, it becomes possible to switch the communication modes abreast of changes in the communication environment, and thereby possible to perform efficient communication using the most suitable mode for the environment at that time. Meanwhile, for the area 30, because communication there is expected to be stable, the long measurement interval can be selected to make it possible to reduce the processes with regards to switching the communication modes, and thereby possible to improve processing efficiency in the wireless communication device 10.

Also, the measurement interval 1601 may be able to be changed according to the movement speed of the wireless communication device 10. If the movement speed gets higher, there would be faster changes in the communication environment surrounding the wireless communication device 10. Therefore in this case, setting the short measurement interval 1601 makes it possible to switch the communication modes abreast of such a changing pace and thereby possible to perform communication using the most suitable mode for the environment at that time.

In the wireless communication device 10 of the present embodiment, measurement is carried out at the predetermined time interval. By measuring travel distance of the wireless communication device 10, measurement may be carried out every time the device 10 moves a predetermined travel distance. While the travel distance is short, the received radio-signal strength is unlikely to be changed rapidly. Therefore, during this period, by reducing frequency of the processes for measuring required information and determining whether or not to switch the communication modes, and the other processes, it becomes possible to lessen processing load on the wireless communication device 10.

Figure 12:
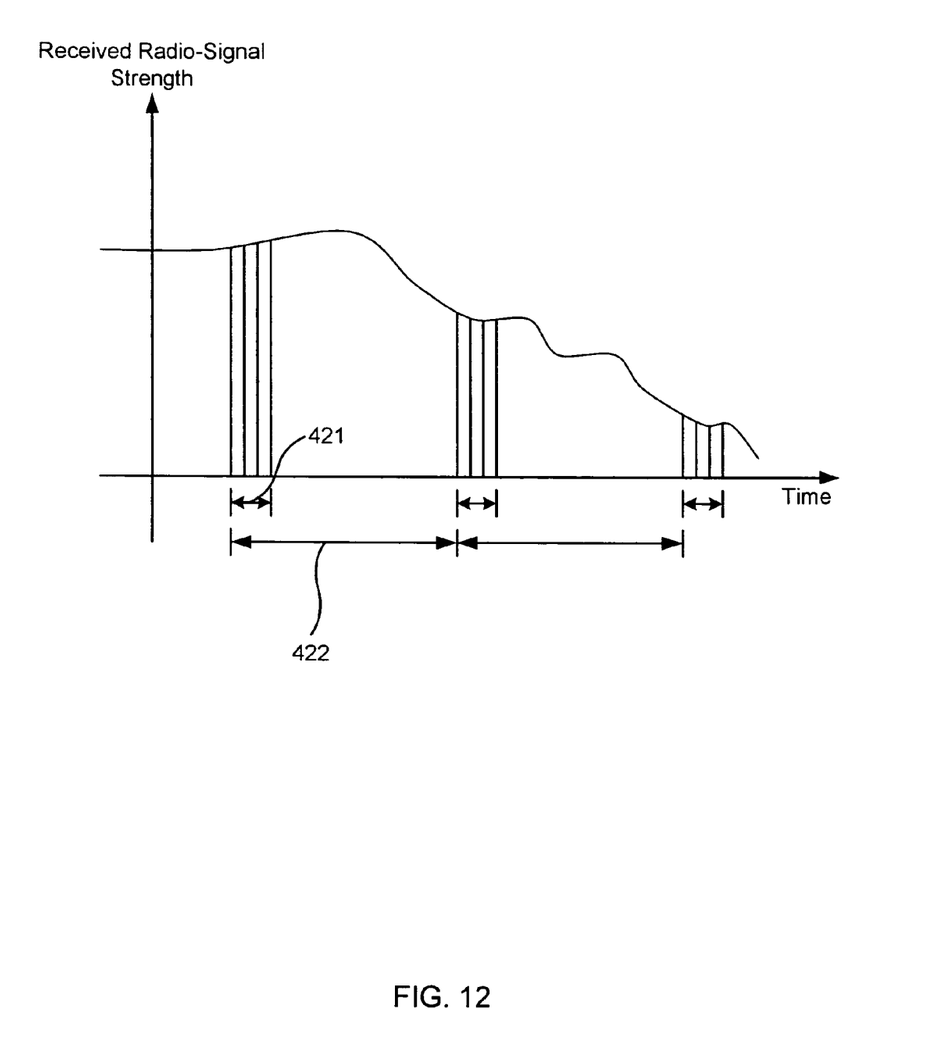
FIG. 12 shows an example of changes of the received radio-signal strength, according to elapsed time while a receiver is moving away from a transmitter.

Moreover, as the received radio-signal strength, measurement may be arranged to be made several times and an average of these measured values may be adopted. As understood from FIG. 11, the weaker the radio-signal strength becomes, the wilder fluctuation of the measured values becomes. By averaging several measurements, more reliable value can be obtained. FIG. 12 shows an example of changes of the received radio-signal strength, according to elapsed time while a receiver is moving away from a transmitter. In FIG. 12, shown are changes of the received radio-signal strength while the wireless communication device 10 is moving away from the base station. In an embodiment of FIG. 12, the received radio-signal strength measurement unit 112 carries out several measurements (four times in this example) during an interval 421 which is shorter than an interval 422 as the measurement interval 1601 of the configuration information 160, and then calculates the average of the measured values.

Moreover, in the present embodiment, the communication quality evaluation unit 115 evaluates the communication quality according to whether or not the retransmission count 153 exceeds the threshold, but the other criteria may be also used in this evaluation, for example, the number of times of error such as CRC or OOF (Out of Frame), or error rate such as BER (Bit Error Rate) or PER (Packet Error Rate). Or, the communication quality evaluation unit 115 may evaluate the communication quality based on both of the retransmission count 153 and the received radio-signal strength 152.

In the process of FIG. 9 described before, the communication mode switch unit 118 evaluates the communication quality based on the retransmission count 153 and the received radio-signal strength 152 in the steps of S342 and S343. Instead of it, the communication parameter specified values 158 corresponding to the communication quality evaluation information 154 that is the evaluation value by the communication quality evaluation unit 115, may be set in the communication parameters 157.

In the present embodiment, there are two evaluation types for the communication quality, "good" and "not good", but instead a plurality of values may be adopted as evaluation values. In this case, for each of possible values as evaluation values for the communication quality, the communication parameter specified values 158 are stored in the storage unit 150 in advance, so that the values 158 corresponding to the communication quality evaluation information 154 can be set in the communication parameters 157.

The environmental information measured by the environmental information measurement unit 111 may include other information such as a type of a vehicle in which the wireless communication device 10 is installed. In this case, the communication mode can be selected appropriately according to a vehicle type. A vehicle type may be specified by, for example, accepting a user's input.

The environmental information measured by the environmental information measurement unit 111 may include meteorological data such as weather, humidity, amounts of rainfall and sunlight, in addition to the ambient temperature. Such meteorological data may be measured by the wireless communication device 10 with use of sensors, or may be distributed from the base station.

The wireless communication device 10 may further comprise a measurement history information transmission unit for transmitting to the base station the measurement history information registered in the measurement history 151. In this case, the base station can collect the measurement history information transmitted from various wireless communication devices 10. Taking the collected information into consideration, the base station can take appropriate measures to improve communication performance in the wireless communication devices 10, such as addition and/or relocation of antenna. Moreover, in this case, the wireless communication device 10 may delete from the measurement history 151 the measurement history information that has been transmitted to the base station. By doing this, the storage resources of the wireless communication device 10 can be made effective use of. Furthermore, a plurality of the measurement histories 151 may be included in the storage unit 150 so that the measured record can be registered therein even while the measurement history information transmission unit is transmitting the measurement history information to the base station.

In the present embodiment, the disconnection detection unit 118 increments or decrements the disconnection count 159 according to whether or not there is a response from the base station. However, for example, the disconnection count 159 may be set to "0 (zero)", or may be reduced to half if there is a response. Also, as to the not-good count 155, the communication quality evaluation unit 115 may set "0" in it if the communication quality is evaluated as "good".

In the present embodiment, the communication quality is evaluated as good or not good according to whether or not the retransmission count 153 exceeds the retransmission count threshold 1605 of the configuration information 160. Instead of such evaluation system, two thresholds may be provided and the communication quality may be evaluated as "not good" if the retransmission count 153 exceeds one threshold, while the quality may be evaluated as "good" if the count 153 becomes below the other threshold. By this system, even under a circumstance that the retransmission count 153 repeatedly increases and decreases around the threshold value, it can be avoided that the communication mode would be switched too often, and thereby it becomes possible to improve communication efficiency.

While the present disclosure is susceptible to various modifications and alternative forms, specific exemplary embodiments thereof have been shown by way of example in the drawings and have herein be described in detail. It should be understood, however, that there is no intent to limit the present disclosure to the particular forms disclosed, but on the contrary, the intention is to cover all modifications, equivalents, and alternatives falling within the spirit and scope of the present disclosure.

According to the present disclosure, it is possible to perform communication adapted to changes in a communication environment.

What is claimed is:

1. A wireless communication device, comprising:
   a wireless communication unit for performing communication with another communication device through communications with base stations of a wireless communication network;
   a received radio-signal strength measurement unit for measuring strength of a radio-signal received from a current base station currently used for communication to the another communication device;
   a retransmission count unit for counting how many times a same packet is retransmitted by the wireless communication unit;
   an environmental information measurement unit for measuring environmental information which includes at least one of: a movement speed of the wireless communication device, a number of base stations with which the wireless communication unit can communicate, a number of other communication devices with which the wireless communication unit can communicate, and a position of the wireless communication device;
   a communication quality evaluation unit for evaluating an evaluation value at least in two grades, with regards to a communication quality of the communication; and
   a measurement history information memory unit memorizing, for respective measurements of a plurality of measurements, a date and time of a measurement, a received radio-signal strength measured by the received radio-signal strength measurement unit, a retransmission count counted by the retransmission count unit, the environmental information measured by the environmental information measurement unit, the communication quality evaluated by the communication quality evaluation unit, as one set of history information for the measurement;
   a communication parameter memory unit memorizing a one set of communication parameters which includes a retransmission interval, a redundant transmission flag, a packet length, and a transmission power, for each communication quality; and
   a communication mode switch unit that enables switching of a communication mode of the communication with said current base station currently performing the communication, between a communication mode based on a history that uses the history information and a communication mode according to a currently measured value, wherein,
   the communication mode switch unit determines whether or not there is registered in the history information, measurement history information having entries which correspond to a currently measured value of the received radio-signal strength, retransmission count, and environmental information,
   if there is registered such measurement history information, a history mode switch unit is enabled to set a communication mode of communication with said current base station to the communication mode based on the history, and to set the one set of communication parameters to communication parameters which correspond to such measurement history information, so that the wireless communication unit performs communication with the another communication device via a same said current base station using the one set of communication parameters which corresponds to the quality of such measurement history information, and
   if there is not registered such measurement history information, the communication mode switch unit is enabled to set the communication mode of communication with said current base station to the communication mode according to the currently measured value, to set the one set of communication parameters based on the currently measured value, and to communicate in the selected communication mode with the same said current base station using the communication mode according to the currently measured value.

2. A wireless communication device according to claim 1, wherein the communication quality evaluation unit generates the evaluation value based on strength of radio-signal received from the another communication device via said current base station.

3. A wireless communication device according to claim 2, further comprising:
   a received radio-signal strength measurement unit for measuring the strength of the radio-signal received from the another communication device via said current base station a plurality of times, and calculating an average value of the measured values of the received radio-signal strength, wherein the communication quality evaluation unit generates the evaluation value based on the average value.

4. A wireless communication device according to claim 1, wherein the communication quality evaluation unit generates the evaluation value based on the number of times that the wireless communication unit retransmits data to be transmitted to the another communication device during a predetermined time period.

5. A wireless communication device according to claim 1, further comprising:
a communication possibility/impossibility determination unit for determining whether or not the communication with the another communication device is impossible,
wherein the wireless communication unit:
if the communication is impossible, then, saves data to be transmitted to the another communication device as untransmitted data; or
if the communication is possible, then, transmits the untransmitted data, if any, to the another communication device.

6. A wireless communication device according to claim 1, further comprising:
an evaluation interval input unit for accepting a user's input as to an interval of generating the evaluation value with regards to the communication quality; and
an evaluation interval storage unit for storing an accepted interval from the evaluation interval input unit, wherein the communication quality evaluation unit generates the evaluation value with regards to the communication quality at that said accepted interval.

7. A wireless communication device according to claim 1, further comprising:
a movement speed measurement unit for measuring a movement speed of the wireless communication device; and
an evaluation interval setting unit for setting an interval of generating the evaluation value according to the movement speed, wherein the communication quality evaluation unit generates the evaluation value at the set interval.

8. A wireless communication device according to claim 1, further comprising:
a movement distance measurement unit for measuring a movement distance of the wireless communication device,
wherein the communication quality evaluation unit generates the evaluation value every time the wireless communication device moves a predetermined movement distance.

9. A wireless communication device according to claim 1, wherein, according to the movement speed of the wireless communication device, at least one of measurement intervals at which the environmental information measurement unit measures the environmental information, the received radio-signal strength measurement unit measures the received radio-signal strength, and the retransmission count unit counts times of retransmission is changed.

10. A wireless communication device according to claim 9, wherein, if the movement speed of the wireless communication device is a first movement speed, the time interval is set to a first time interval, and, if the movement speed of the wireless communication device is a second movement speed that is faster than the first movement speed, the time interval is set to the second time interval that is shorter than the first time interval.

11. A wireless communication method carried out using a wireless communication device, comprising:
performing communication with another communication device through communications with base stations of a wireless communication network, via a wireless communication unit;
measuring strength of a radio-signal received from a current base station currently used for communication to the another communication device;
counting how many times a same packet is retransmitted by the wireless communication unit;
measuring environmental information which includes at least one of: a movement speed of the wireless communication device, a number of base stations with which the wireless communication unit can communicate, a number of other communication devices with which the wireless communication unit can communicate, and a position of the wireless communication device;
evaluating an evaluation value at least in two grades, with regards to a communication quality of the communication; and
memorizing, for respective measurements of a plurality of measurements, a date and time of a measurement, a received radio-signal strength measured by the measuring strength operation, a retransmission count counted by the counting operation, the environmental information measured by the measuring environmental information operation, the communication quality evaluated by the evaluating operation, as one set of history information for the measurement;
memorizing a one set of communication parameters which includes a retransmission interval, a redundant transmission flag, a packet length, and a transmission power, for each communication quality; and
enabling, via a communication mode switch unit, switching of a communication mode of the communication with said current base station currently performing the communication, between a communication mode based on a history that uses the history information and a communication mode according to a currently measured value, wherein,
the communication mode switch unit determines whether or not there is registered in the history information, measurement history information having entries which correspond to a currently measured value of the received radio-signal strength, retransmission count, and environmental information,
if there is registered such measurement history information, a history mode switch unit is enabled to set a communication mode of communication with said current base station to the communication mode based on the history, and to set the one set of communication parameters to communication parameters which correspond to such measurement history information, so that the wireless communication unit performs communication with the another communication device via a same said current base station using the one set of communication parameters which corresponds to the quality of such measurement history information, and
if there is not registered such measurement history information, the communication mode switch unit is enabled to set the communication mode of communication with said current base station to the communication mode according to the currently measured value, to set the one set of communication parameters based on the currently measured value, and to communicate in the selected communication mode with the same said current base station using the communication mode according to the currently measured value.

12. A wireless communication device according to claim 1, wherein, according to a distance between the wireless communication device and the base station, at least one of measurement intervals at which the environmental information measurement unit measures the environmental information, the received radio-signal strength measurement unit measures the received radio-signal strength, and the retransmission count unit counts times of retransmission, is changed.

13. A wireless communication device according to claim 12, wherein, if the distance between the wireless communication device and the base station is a first distance, the time interval is set to a first time interval, and, if the distance between the wireless communication device and the base station is a second distance that is longer than the first distance, the time interval is set to the second time interval that is shorter than the first time interval.

\* \* \* \* \*